Dec. 25, 1951 — C. C. HORSTMAN ET AL — 2,579,578
THREE-PHASE CORE
Filed Nov. 26, 1948 — 6 Sheets-Sheet 1

WITNESSES:
Robert C. Baird
New C. Groome

INVENTORS
Clifford C. Horstman, Belvin B. Ellis
& Charles E. Burkhardt.
BY Franklin E. Hardy
ATTORNEY Dec. 25, 1951     C. C. HORSTMAN ET AL     2,579,578
THREE-PHASE CORE
Filed Nov. 26, 1948                                     6 Sheets-Sheet 2
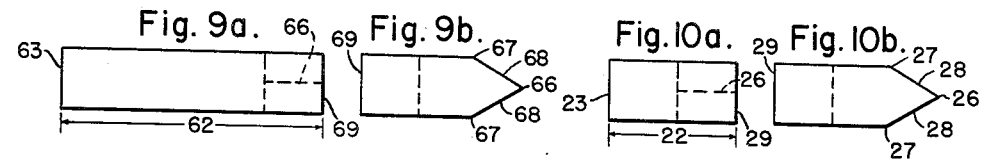
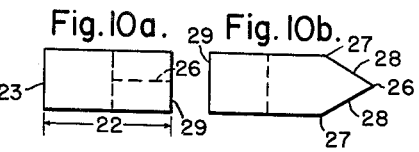
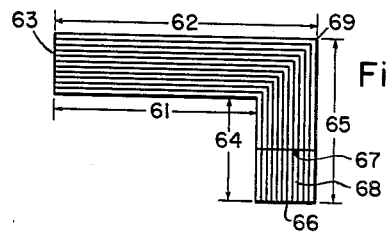
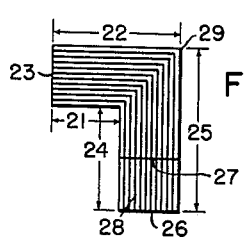
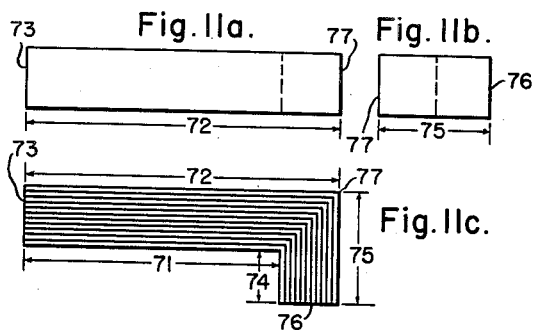
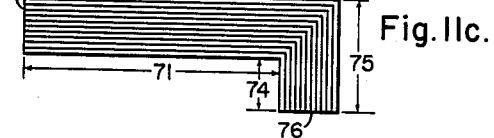
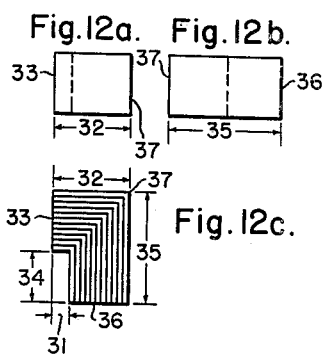
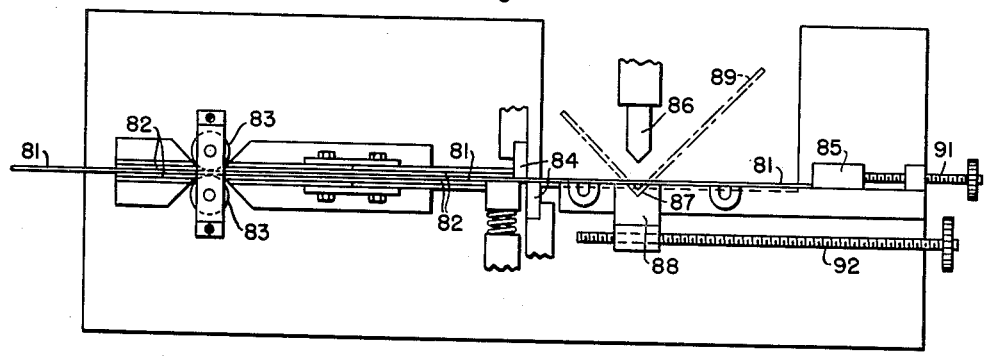
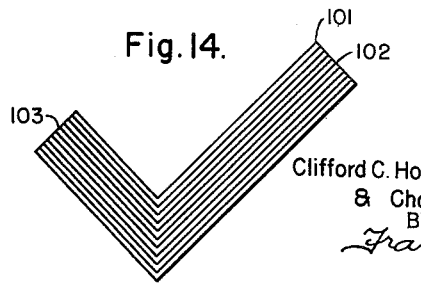
INVENTORS
Clifford C. Horstman, Belvin B. Ellis
& Charles E. Burkhardt.
BY Franklin E. Hardy
ATTORNEY Dec. 25, 1951 C. C. HORSTMAN ET AL 2,579,578
THREE-PHASE CORE
Filed Nov. 26, 1948 6 Sheets-Sheet 3

WITNESSES:
Robert C. Baird
Nw. L. Groove

INVENTORS
Clifford C. Horstman, Belvin B. Ellis
& Charles E. Burkhardt.
BY Franklin E. Hardy
ATTORNEY Dec. 25, 1951  C. C. HORSTMAN ET AL  2,579,578
THREE-PHASE CORE
Filed Nov. 26, 1948  6 Sheets-Sheet 4
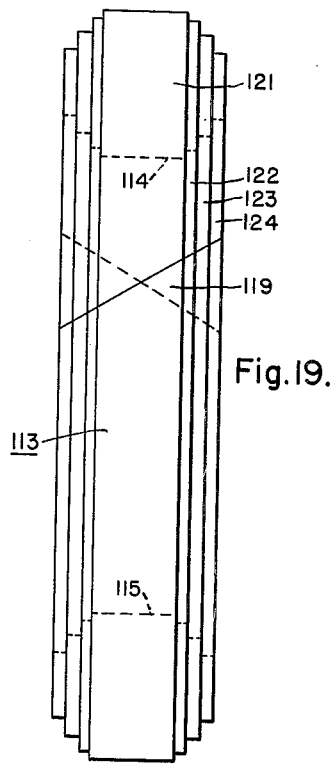
Fig. 19.
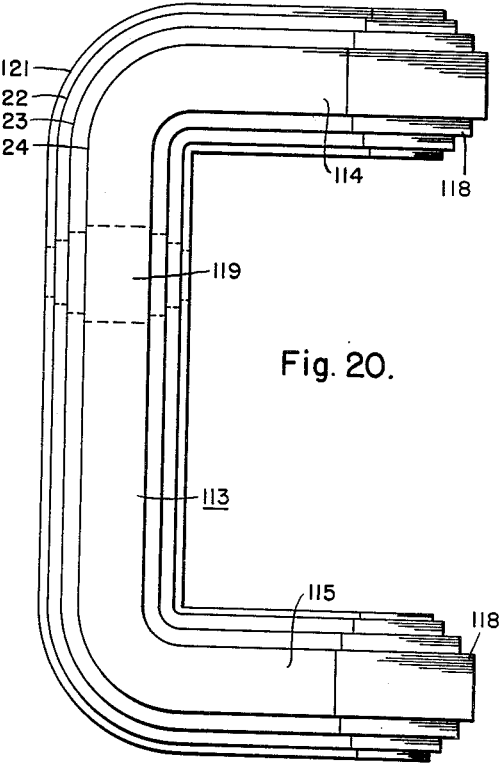
Fig. 20.
Fig. 22.  Fig. 23.  Fig. 24.
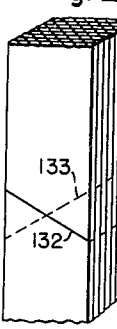 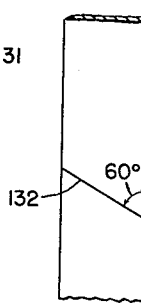 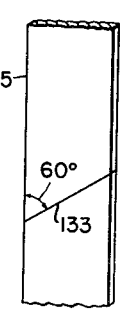
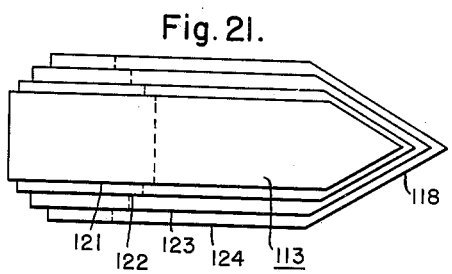
Fig. 21.
Fig. 25.
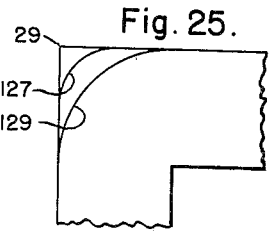
WITNESSES:
Robert C. Baird
New L. Groome
INVENTORS
Clifford C. Horstman, Belvin B. Ellis
& Charles E. Burkhardt.
BY
Franklin E. Hardy
ATTORNEY Dec. 25, 1951  C. C. HORSTMAN ET AL  2,579,578
THREE-PHASE CORE
Filed Nov. 26, 1948  6 Sheets-Sheet 5
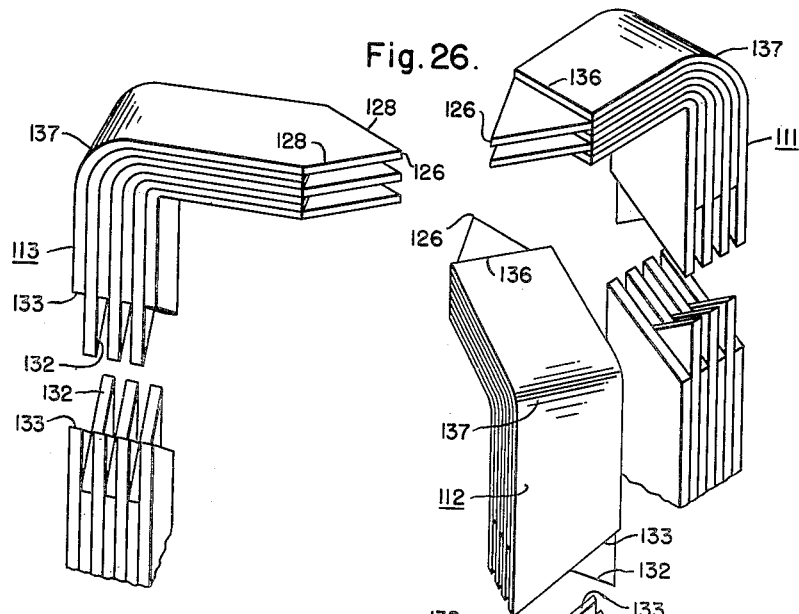
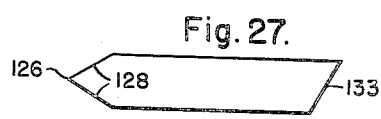
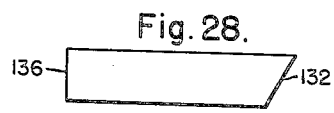
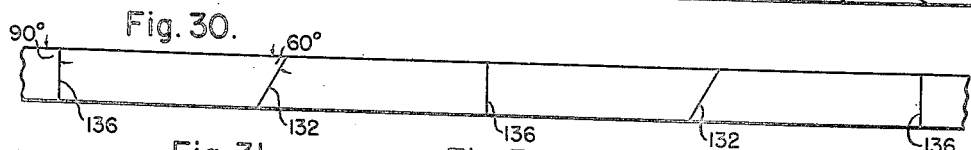
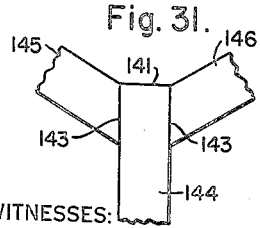 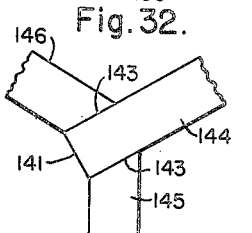 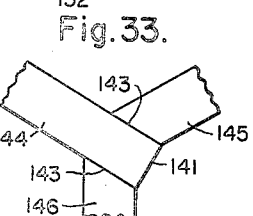
WITNESSES:
Robert C. Baird
Wm. C. Groome
INVENTORS
Clifford C. Horstman, Belvin B. Ellis
& Charles E. Burkhardt.
BY Franklin E. Hardy
ATTORNEY Dec. 25, 1951     C. C. HORSTMAN ET AL     2,579,578
THREE-PHASE CORE
Filed Nov. 26, 1948     6 Sheets-Sheet 6
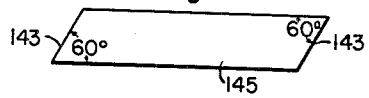
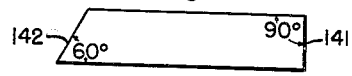
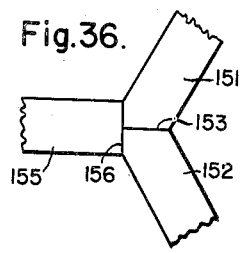
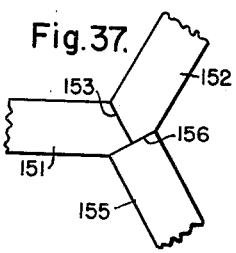
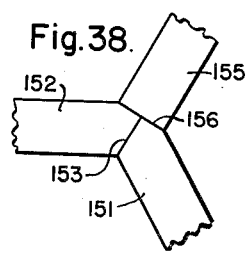
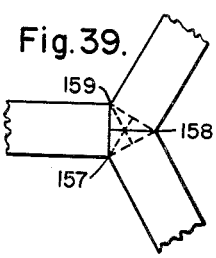
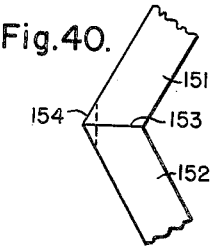
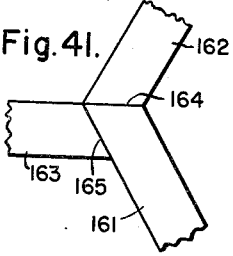
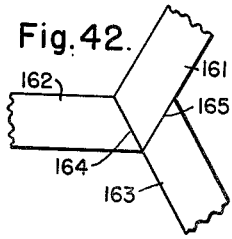
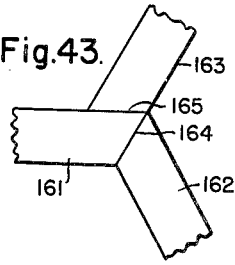
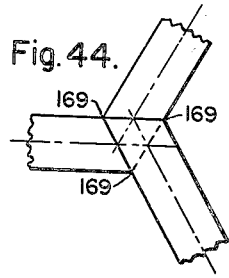
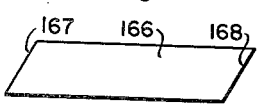
INVENTORS
Clifford C. Horstman, Belvin B. Ellis
& Charles E. Burkhardt.
ATTORNEY Patented Dec. 25, 1951

2,579,578

UNITED STATES PATENT OFFICE 2,579,578

THREE-PHASE CORE

Clifford C. Horstman, Sharpsville, and Charles E. Burkhardt and Belvin B. Ellis, Sharon, Pa., assignors to Westinghouse Electric Corporation, East Pittsburgh, Pa., a corporation of Pennsylvania Application November 26, 1948, Serial No. 62,162

19 Claims. (Cl. 175—356)

Our invention relates to electrical induction apparatus, such as transformers and particularly to the core or magnetic circuit structure thereof and to the method of making the core. More particularly, our invention relates to the core structure of three-phase transformers used with alternating-current electric circuits in which separate sets of phase windings are provided for connection to the separate phases of three-phase circuits.

Our invention relates particularly to core structures for electrical transformers formed of layers of magnetic sheet steel ribbon having preferred magnetic characteristics in the direction of the sheet from which the core parts are formed.

It has been found that if a core is formed of layers of sheet steel having the most favorable magnetic characteristics in the direction in which the magnetic flux passes through the strips or sheets of steel, a core having high permeability and low watts loss will result.

To properly take advantage of the properties of such steel, it is necessary that the steel be so used that the direction of magnetization of the steel coincides substantially with the grain or direction of rolling of the steel so that the lines of magnetic flux shall not pass through the steel at an appreciable angle from the direction of rolling.

Three-phase transformer core structures have been made of stacked core construction in which a large number of flat pieces are stacked to form the desired size and shape of a core providing three winding leg portions in a row for accommodating the three sets of phase windings. Such core structures have certain limitations due to the cross magnetic flux at the ends of the sheets in the area of the corners of the core structure, resulting in high losses in these areas, high heating, and noise due to magnetostriction.

To overcome these limitations, cores have been built with the joints between edges of the lamination layers extending at substantially 45° to the direction of the sheet. In such cores relatively small overlap between the layers of sheet steel at the joints is provided so as to reduce the cross flux. This small overlap results in large localized physical strain because of variations in the thickness of the strips of magnetic sheet steel. This strain increases magnetostriction, core loss, and excitation current, and thus increases the noise level of the core and impairs its magnetic qualities.

Core loop structures, having upper and lower U-shaped sections, have been built formed of successive layers of magnetic sheet material wound flatwise layer upon layer and bonded together by filling the spaces between successive layers of turns of magnetic material with bonding or filling material, thereby providing a solid or non-yielding laminated structure having a film interlayer bond for all portions of the layers of sheet steel which is beneficial in producing a true and relatively smooth cut surface forming the faces of butt joints between upper and lower sections of the core loop.

In such prior art three-phase core structure, the iron loss is high, the noise level of the core is high, that is, much higher than the corresponding values for the individual laminations making up the core for the same induction.

It is an object of the invention to provide an efficient three-phase core structure having smaller dimensions, a shorter length of magnetic circuit path, lighter weight of core, less iron loss in the core and a lower exciting current than the conventional three-phase core structures commonly used.

It is another object of the invention to provide an efficient three-phase core structure for transformers that is so shaped as to make more effective use of the available space, such as for use in round tanks or square tanks.

A still further object of the invention is the provision of a three-phase core of the above-indicated character having more effective joints than either the conventional butt joints or the lap-type joints commonly used in the prior art.

A still further object of the invention is the provision of a three-phase core of the above-indicated character having a lower noise level than conventional transformer structures.

It is a further object of the invention to provide a three-phase core structure in which the several winding leg members of the structures extend radially outward from a central axis and are equally spaced from one another.

Other objects and advantages of the invention will be apparent from the following description of certain preferred embodiments thereof, references being had to the accompanying drawings, in which:

Fig. 9a illustrates a side elevational view, Fig. 9b an end view, and Fig. 9c a plan view of a bent stack of lamination layers of magnetic sheet steel used in making the core structure of Figs. 2 and 3;

Fig. 10a illustrates a side elevational view, Fig. 10b an end view, and Fig. 10c a plan view of another stack of lamination layers of magnetic sheet steel used in making the core structure of Figs. 2 and 3;

Fig. 11a illustrates a side elevational view, Fig. 11b an end view, and Fig. 11c a plan view of a third bent stack of lamination layers of magnetic sheet steel used in making the core structure illustrated in Figs. 2 and 3;

Fig. 12a illustrates a side view, Fig. 12b an end view, and Fig. 12c a plan view of a fourth bent stack of lamination layers of magnetic sheet steel used in making the core structure illustrated in Figs. 2 and 3;

Fig. 13 is a top plan view illustrating the essential elements of a cutting and bending machine that may be employed in forming the stacks of lamination layers illustrated in Figs. 9, 10, 11 and 12;

Fig. 14 is a view of a group of lamination layers cut and bent to an L-shape for use in the manufacture of the transformer structure;

Fig. 19 is a front elevational view of one of the three winding legs with the associated yoke portions employed in the core structure illustrated in Fig. 18;

Fig. 20 is a side elevation view of the structure shown in Fig. 19;

Fig. 21 is a top plan view of the structure shown in Fig. 20;

Fig. 22 is a perspective view of lamination layers assembled to form one type of joint adaptable for use in the leg portions of the core structure of our invention;

Figs. 23 and 24 illustrate the arrangement of the joint between adjacent layers of laminations forming the joint structure shown in Fig. 22;

Fig. 25 is a side elevational view of a portion of the core structure illustrating different arrangements of the lamination layers at the corners of the core structure between the leg and yoke portions thereof;

Fig. 26 is a perspective view of the parts of a core structure having round corners, V-shaped top and bottom joints, and angle leg joints with the lower parts of the structure broken away;

Figs. 27 and 28 illustrate two shapes of punchings or sheared lamination layers that are used in constructing the symmetrical three-legged core structure shown in Fig. 26;

Fig. 29 is a view illustrating one manner in which 60° angle lamination layers (as shown in Fig. 27) may be sheared from continuous strip of magnetic sheet steel on an oscillating shear;

Fig. 30 illustrates the manner in which 90° angle lamination layers (as shown in Fig. 28) may be sheared from a continuous strip of magnetic material;

Figs. 31, 32 and 33 illustrate the patterns of three successive layers of top and bottom center joints of a symmetrical three-phase transformer core structure formed from core punchings having the configurations shown in Figs. 34 and 35;

Figs. 36, 37 and 38 illustrate the patterns of three successive layers at the top and bottom center joints of a symmetrical three-phase transformer core structure having the shapes illustrated in these figures of the drawings;

Fig. 39 illustrates the triangular overlap at the center joint formed from superposing the patterns shown in Figs. 36, 37 and 38;

Fig. 40 illustrates the arrangement of two lamination layers before being cut to form a part of the layer shown in Figs. 36 to 39;

Figs. 41, 42 and 43 illustrate three patterns corresponding to three successive layers of another embodiment of the top and bottom joint of a three-phase transformer core;

Fig. 44 shows the interleaved joint formed by stacking the layers arranged in the patterns shown in Figs. 41, 42 and 43, the one upon the other;

Fig. 45 is a view showing the shape of the sheets of lamination layers used in the embodiment of the invention shown in Figs. 41 to 44;

Figure 1:
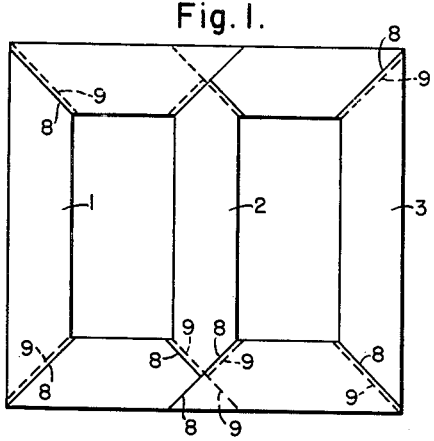
Figure 1 is an elevational view of a prior art three-phase core structure.
Figure 7:
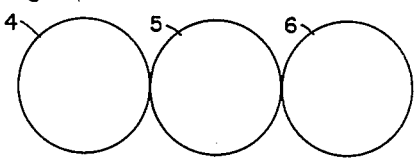
Fig. 7 is an outline plan view showing the general arrangement of the phase windings employing the core structure illustrated in Fig. 1.

Referring to the drawings, Fig. 1 illustrates a three-phase core structure formed of stacked lamination layers in accordance with the teachings of the patent to H. V. Putman, No. 2,300,964, issued November 3, 1942, and assigned to the same assignee as this application. The three winding legs 1, 2 and 3 of the core structure are parallel to each other and spaced in a row so that the three sets of phase windings are arranged in a straight line as shown in plan view at 4, 5 and 6 in Fig. 7.

Figure 2:
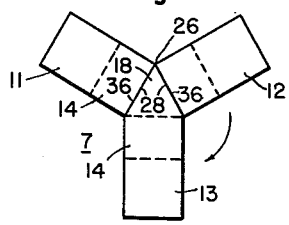
Fig. 2 is a plan view of a core structure made in accordance with one embodiment of our invention.
Figure 3:
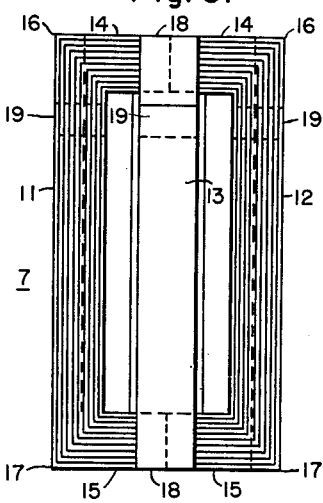
Fig. 3 is an elevational view of the core structure shown in Fig. 2.
Figure 8:
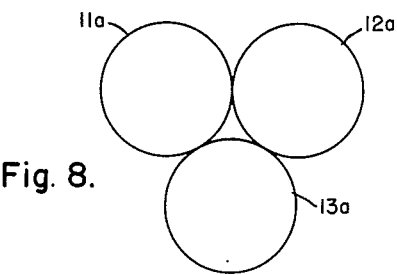
Fig. 8 is an outline plan view illustrating the general arrangement of the phase windings in a transformer using a core such as illustrated in Figs. 2 and 3.

In accordance with the embodiment of the invention illustrated in Figs. 2 and 3, a core structure 7 is formed having three parallel winding leg portions 11, 12 and 13 spaced symmetrically about a common center or axis so that the three sets of phase windings have the relative positions with respect to one another shown at 11a, 12a and 13a in Fig. 8.

In the prior art core structure illustrated in Fig. 1, the sheets of lamination layers are sheared to the illustrated shapes having joints in each layer that extend at an angle of substantially 45° from the direction of the sheet and are overlapped between adjacent layers an amount illustrated by the full-line joint 8 and dotted-line joint 9 corresponding, respectively, to the joints in adjacent layers of the core structure.

This prior art structure has certain disadvantages and limitations inherent in its structure. With the use of 45° joints at the corners, it is necessary for the magnetic flux to travel across the lamination layers at the ends instead of along the length of the sheet of magnetic material, which is the direction of easiest magnetization of material. When the flux travels across the end of the magnetic material, it is passing in the direction of most difficult magnetization and in the direction of worst magnetostriction effects. Consequently, the noise resulting from high magnetostriction is higher than when the flux travels in the direction of the strip.

Also, the overlap at the corners is insufficient and large physical strain results from variations in the thickness of the strips of magnetic sheet steel which again is a cause of increased magnetostriction, increased core loss and increased exciting current.

Since the magnetic circuit shown in Fig. 1 is not symmetrical with respect to the positioning of the winding leg portions of the core to each other, the reluctance of the magnetic circuit path including the winding legs 1 and 3 is greater than for the magnetic circuit path including the legs 1 and 2, or the legs 2 and 3, so that the reluctance of the three magnetic paths are unbalanced. The lack of symmetry requires a greater volume, and greater weight, of electrical sheet steel than is required in a symmetrical designed core of the same kilovolt ampere rating and voltage class.

In the type of structure illustrated in Fig. 1, the core is solidly clamped at its corners thus causing the core to vibrate in a manner such that the entire leg sections bow during excitation and in a direction opposite to the bow on the end or yoke sections of the core, thus transmitting a large percentage of the vibrations of the core structure in the form of noise.

Referring to Figs. 2 and 3, the three parallel leg portions 11, 12 and 13 are each provided at the top and bottom with inwardly extending yoke portions 14 and 15 that extend substantially at right angles to the leg portions of the core structure and are shown in Fig. 3 as being bent at 16 and 17 to form square corners between the yoke and leg portions of the core. The lamination layers unite to form center joints 18 at the top and bottom of the core structure which are spaced along the axis of the core. Leg joints 19 are provided in the leg portions of the core thus permitting the upper core section and the lower core section to be separated for the purposes of assembling the coils about the winding leg portions of the lower core section of the core structure, and then uniting the upper and lower sections to form the completed core structure.

In accordance with the invention, four different shaped stacks of lamination layers are used as shown in Figs. 9a, 10a, 11a and 12a, respectively. In a completed core structure built in accordance with the structure illustrated in Figs. 2 and 3, use is made of six stacks of lamination layers one stack corresponding to that shown in Fig. 9a, one stack corresponding to that shown in Fig. 10a, two stacks corresponding to that shown in Fig. 11a and two stacks corresponding to that shown in Fig. 12a. The stacks of lamination layers are formed by shearing and bending sheets of lamination layers so that the lengths of the individual layers from the corners of the core structure to their ends at the center joint or leg joint of the completed core structure vary from layer to layer as shown in the L-shaped stacks of lamination layers.

Figure 4:
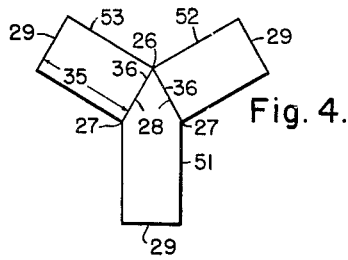
Figs. 4, 5 and 6 are plan views of successive lamination layers illustrating how the lamination layers meet to form the top and bottom center joints of the core structure illustrated in Figs. 2 and 3.
Figure 5:
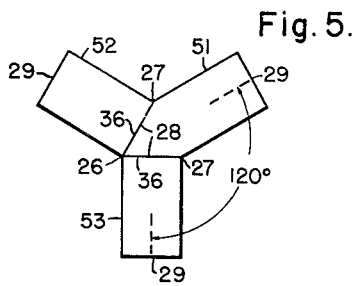
Figure 6:
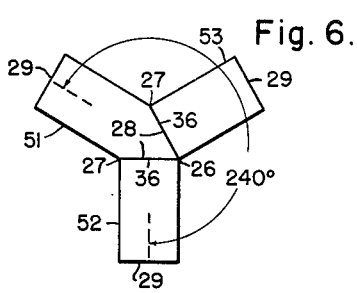

Figs. 4, 5 and 6 illustrate, respectively, three layers of magnetic sheet material meeting at the center joint at the top or bottom of the core structure. The upper portion of the core is formed from one stack of lamination layers corresponding to Fig. 10a and two stacks of lamination layers corresponding to Fig. 12a.

The stacks of lamination layers shown in Figs. 10a and 12a are each formed of a group of sheets of magnetic sheet steel having the desired width and shape, the successive layers being graduated in length from the shortest to the longest so that when the two ends are bent at right angles to each other, the ends of the laminations in the L-shaped stack will terminate substantially in planes at right angles to the planes of the lamination layers.

In the stack of lamination layers illustrated in Fig. 10a, the length of the individual layers from the corner to one end of the stack varies from the dimension 21, shown in Fig. 10c, to 22 so that the ends of the lamination layers will terminate in a plane 23 at right angles to the layers and the lamination layers extending in the other direction from the square corners 29 will vary from the dimension 24 to the dimension 25 terminating along the line 26 corresponding to the points of the several V-shaped ends of the lamination layers as best shown in Fig. 10b. The pointed ends of the stack are cut to extend from the point 26 to the points 27 forming straight edges 28 at 60° to each other, that is, at 30° to the direction of the strip.

In Fig. 12a, a generally similar stack of L-shaped lamination layers is shown having different dimensions, and in which the ends of the lamination layers are cut at right angles to the direction of the strip at both ends of the strip. As shown in Fig. 12c, the length of the strips or lamination layers from the right angle bends will vary in one part of the structure from the dimensions 31 for the inner layer to the dimension 32 for the outer layer, and, in the other direction from the corner, from the shorter dimension 34 to the longer dimension 35 terminating in planes 33 and 36, respectively, and providing square corners 37.

The stack of laminations shown in Fig. 9a corresponds generally to the stack shown in Fig. 10a except for the different dimensions of the parts. The lamination layers extending from the right angle corner to the left corner 63 as shown in Fig. 9c vary in length from the dimension 61 for the shorter layer to the dimension 62 for the longer layer so that all of the lamination layers in the horizontal leg, as shown in Fig. 9c terminate at a plane 69 at right angles to the direction of the lamination layers. In the other leg of the L-shaped stack of laminations, the length of the lamination layers from the right angle bend to the end of that leg of the stack varies from the dimension 64 to the dimension 65 so that all of the V-shaped ends will terminate along the line 66 at right angles to the plane of the lamination layers. The ends of the lamination layers are cut to form edges 68 extending at an angle of 30° to the direction of the strip, that is, at an angle of 60° to each other from the point at 66 to the points 67 along the edges of the strip of lamination layers forming the stack.

Figs. 11a, 11b and 11c show an L-shaped stack of laminations similar generally to those shown in Figs. 12a, 12b and 12c except that one leg of the L-shaped stack is longer than the corresponding legs shown in Figs. 12a, 12b and 12c. In Fig. 11c, the leg of the stack of laminations shown horizontally varies in length from the dimension 71 for the inner lamination of the stack to the dimension 72 in the outer lamination of the stack, the lamination layers terminating in a plane 73 at right angles to the direction of the lamination layers and the laminations contained in the vertical leg, as shown in Fig. 11c, varies in length from the dimension 74 to the dimension 75 terminating in a plane 76 at right angles to the direction of lamination layers as they extend from the square corner 77.

Referring to Figs. 4, 5 and 6, the upper part of the core structure is formed from one stack of laminations 51 layers corresponding to Fig. 10a and two stacks 52 and 53 corresponding to Fig. 12a. As shown in Fig. 4, the point 26 of a V-shaped lamination layer and the adjoining edges 28 which are positioned at an angle of 60° with respect to each other extend between the right-angle edges 36 of lamination layers taken from two stacks corresponding to Fig. 12a, making a pattern in which the triangular joint area between the point 26 and the two points 27 in one layer of laminations outline the joint area, and a layer having a V-shaped end covers this triangular area in one layer of the laminations while the other two layers end along the boundary of the triangular-shaped joint area as shown at 36. In successive layers of the joint, a similar pattern of the three lamination layers from the three leg portions of the core exist except for the fact that the dimensions of the lamination layers will vary slightly according to the dimension of the next lamination layer and stack from 21 to 22, and from 24 to 25 for the pointed V-shaped laminations shown in Fig. 10c and from 31 to 32 and from 34 to 35 for the lamination layers ending with right-angle edges 33 and 36, and for the further fact that the pattern shown in Fig. 4 is rotated from layer to layer as shown in Figs. 5 and 6, so that the layer having the V-shaped end is shifted a third of a revolution in each successive layer of the joint. As shown in Fig. 5 for example, the lamination layer having a V-shaped end is rotated 120° from the position shown in Fig. 4, and, as shown in Fig. 6 is rotated 240° from the position shown in Fig. 4. In the next succeeding layer, (the fourth layer of the joint) the pattern will correspond to that shown in Fig. 4 and will continue to rotate a third of a revolution throughout successive layers successively repeating the position shown in Fig. 5 and Fig. 6.

Figure 15:
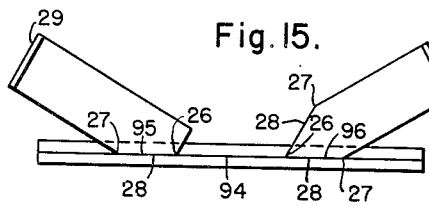
Fig. 15 is a plan view of shears for cutting the ends of certain of the lamination layers to form pointed ends.
Figure 16:
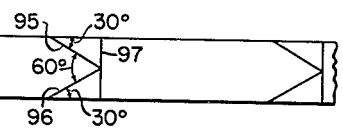
Fig. 16 is a plan view of a strip of magnetic sheet material showing the lines of cut to be made forming 30°-60°-90° triangles from the incoming strip of material.

Many different ways may be employed for forming stacks of lamination layers for use in constructing a three phase transformer in accordance with the invention. Such stacks of lamination layers are shown in Figs. 9a, 10a, 11a and 12a. In one method of forming the stacks of lamination layers, a strip of steel 81 is advanced between guides 82 by rollers 83, as shown in Fig. 13, between cooperating shears 84 in a separated position until the end of the strip 81 engages a stop 85. The shears 84 are then operated to cut a strip of the magnetic sheet steel material of a length corresponding to the distance between the cutting edges of the shears 84 and the stop 85. A V-shaped bender 86 is then operated against the cut strip of sheet steel forcing the steel into a V-shaped notch 87 in a block 88 to bend the strip into an L shape, shown in dotted lines at 89, the two ends extending at right angles to each other from the point of bending. Mechanism indicated generally at 91 and 92 is provided for moving the stop 85, the bender 86 and the block 88 away from the shears for each successive cutting and bending operation so that, for each one of a series of cuts of lamination layers made by the shears, the stop 85 will advance a distance corresponding to twice the thickness of the sheet steel and the bender will advance a distance corresponding to the thickness of the sheet steel, thus building a stack of sheets 101 corresponding to that shown in Fig. 14, in which the distance from the point of bending to each end of the strips will vary along each of the two legs of the L-shaped stack an amount equal to the thickness of the strips, so that the ends of the strips as shown at 102 and 103 will be along planes at right angles to the direction of the strips. The particular mechanism for moving the stop and the bender the desired amounts for each successive operation of the shears may readily be automatically controlled by the use of gear mechanism not shown. After the sheets have been cut and bent to the form shown in Fig. 14, successive lamination layers are cut by shears shown in Fig. 15, wherein the cutting blades meet along a line 94 cutting from the center of the front edge of the strip along the line 95 (Fig. 16) on one side thereof at an angle of 30° as shown in the left portion of Fig. 13 and then moved to the position shown at the right of Fig. 15 to make another cut along the line 96 (Fig. 16) from the center point of the strip at 30° to the length of the strip, thus forming the V-shaped point 25 and the edges 28 extending backward therefrom at an angle of 60° with respect to each other. The strip corresponding to that shown in Fig. 16 will be cut along the line 97 by the machine shown in Fig. 13 and along the lines 95 and 96 by the shears shown in Fig. 15, thus forming a completed stack corresponding either to Fig. 9a or to Fig. 10a, according to the dimensions of the parts.

Figure 17:
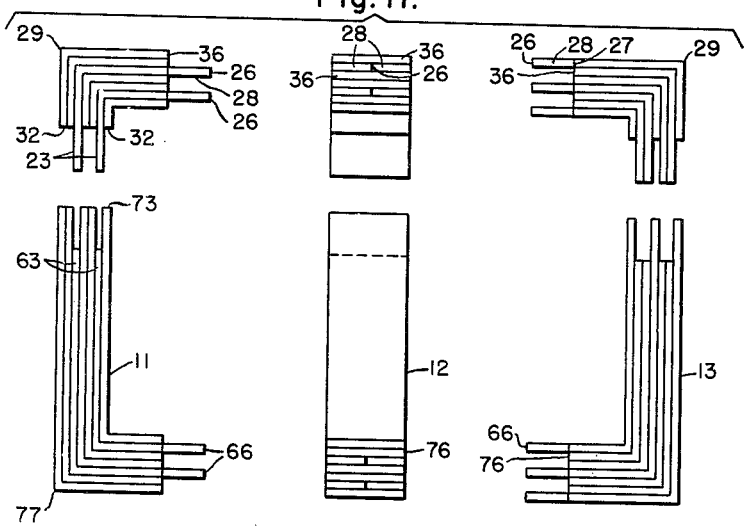
Fig. 17 is a diagrammatic view illustrating six stacks of bent lamination layers of sheet steel punchings, arranged for assembly to form a core structure and positioned in exploded or disassembled relation.

Referring to Fig. 17 and considering the illustrated six parts of the core structure shown in Figs. 2 and 3 in disassembled relation, and assuming that they are being viewed in Fig. 17 from the direction of the arrow shown in Fig. 2, it will be noted that in the upper layer of the center joint at the top of the core structure the strip of magnetic sheet steel from the leg 13 ends in a V-shaped point 26 and extends beyond the second and third layers of sheet steel in leg 13 which have rectangular ends 36. Also, the sheets of steel from legs 11 and 12 in the upper layer of the center joint have rectangular ends 36 that join the sheet from the leg 13 along the edges 28 extending back from the point 26 as shown in Fig. 4. In the next lower layer, the V-shaped point 26 is in the sheet extending from the leg portion 12 and the two edges 28 on the opposite sides of the point 26 will engage with the rectangular end surfaces 36 of the strips of material that extend from the leg 11 and the leg 13 as shown in Fig. 5. Also, in the third layer from the top, the V-shaped point 26 extends from the leg 11 and the edges 28 thereof engage the ends 36 of strips of steel extending from legs 12 and 13 in that layer, as shown in Fig. 6. This rotation of the pattern of the meeting edges of the lamination layers continues down through the several layers forming the top center and the bottom center joints of the core structure. It will be noted that the lamination layers having the longest horizontal ends 26, also have the longest vertical ends 23 which are in the area forming the leg joints, so that in the lower part of the upper section of the core structure, there will be two shorter ends 33 and one longer end 23 meeting, respectively, two longer ends 73 and a shorter end 63 of lamination layers formed from the members taken from the stacks of laminations shown in Figs. 9a and 11a, respectively.

Figure 18:
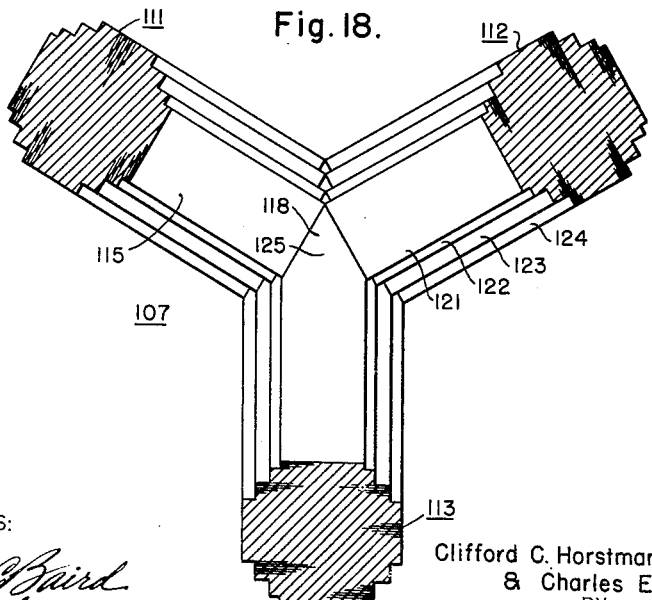
Fig. 18 is a cross sectional view of a three-phase core structure in accordance with the invention in which the core members have a cruciform cross section.

Referring to Figs. 18, 19, 20 and 21, a core structure generally similar to that shown in Figs. 2 and 3 is illustrated having, however a cruciform core section as best shown in Fig. 18. The core 107 is shown as having three winding legs 111, 112, 113 having yoke portions 114 and 115 extending at right angles to the leg portions in a manner similar to that shown in Figs. 2 and 3. The lamination layers from each of the three winding leg portions unite at the ends of the yoke portions to form a central joint area 118 in a manner generally similar to that shown in Figs. 2 and 3, and unite to form winding leg joints at 119 generally similar to that shown in Figs. 2 and 3. It will be noted, however, that with the four different widths of strips of steel 121, 122, 123 and 124 used to form the cruciform structure, the triangular area of the central core joint will vary from width to width of the lamination layers. However, as best shown in Fig. 18, the successive triangles outlining the several center joint areas for the different widths of laminations will have the same center 125 and the center joint structure will be symmetrical about this center as an axis.

In the core structure illustrated in Figs. 18, 19, 20 and 21, the ends of the lamination layers are cut either at 90° or 30° angles with respect to the direction of the strip as in the structure shown in Figs. 2 and 3, and the laminations are interleaved by rotating the pattern of the meeting edges of the joints through one-third of a revolution between successive layers as shown in Figs. 4, 5 and 6. In the present core structure, the corners between the leg portion and yoke portion of the core struction are shown as rounded instead of square.

Referring to Fig. 25, corners of this type of core structure may be either square, as shown at 29, corresponding to that used in the core structure illustrated in Figs. 2 and 3, or round, as shown at 129, corresponding to the corners of the core structure shown in Figs. 18, 19, 20 and 21, or given an intermediate bend such as shown at 127. In the round corner illustrated by the curve 129, the outer lamination layer follows substantially the arc of a circle and the other lamination layers inwardly toward the inner corner are bent to form substantially centric arcs of progressively smaller radii. It is desirable to maintain looseness between lamination layers to eliminate or reduce noise resulting from magnetostriction. To this end the lamination layers may be so bent as to follow a curve, such as that shown at 127 in Fig. 25, allowing a greater distance from the outer lamination to the inner corner of the core structure, and a greater spacing between the individual lamination layers, thus providing relatively loose layers of laminations at the corners. These three different types of corners may be used either with the cruciform structure shown in Fig. 18 or the rectangular structure shown in Figs. 2 and 3. For the purposes of this disclosure the expression "round corners" or "curved corners," unless otherwise indicated, refers to corners that are sufficiently loose as to permit the lamination layers of flex individually at the corners and thus reduce noise.

Likewise, in the structure illustrated in Figs. 18, 19, 20 and 21, an angle leg joint is illustrated which may be used either in the cruciform structure or in the structure shown in Figs. 2 and 3. The structure of the angle leg joint is perhaps most clearly illustrated in Figs. 22, 23 and 24, in which the joint is applied to a rectangular winding leg structure indicated as 131. In this joint, one lamination layer is cut along a straight line 132 at an angle of 60° to the length of the strip and the next adjacent layer is cut along the straight line 133 also at 60° to the direction of the strip but having an opposite slant with respect to a 90° joint so that the successive layers 134 and 135 shown in Figs. 23 and 24, respectively, when assembled in the completed leg 131 of Fig. 22 stack up to form an overlap joint having an X configuration as illustrated. This type of construction has certain advantages were the upper and lower sections of the three-phase core are formed separately, and then brought together, after the phase windings have been placed about the lower winding leg portions of three-phase structure.

Referring to Figs. 26, 27, 28, 29 and 30, a three-phase core structure is illustrated having V-shaped center joints 126, rounded corners 137 between the winding leg portions and the yoke portions and angle leg joints, corresponding to the structure shown in Figs. 18 to 21, inclusive, except that, for purposes of greater clarity in illustrating, the core structure shown is provided with a rectangular cross section instead of a cruciform cross section. However, the principle of the invention is the same regardless of its use in a structure having a rectangular cross section of the core member or a structure having a cruciform cross section of the core members.

The core structure illustrated in Fig. 26 is made up entirely of two different shapes of punchings shown in Figs. 27 and 28 bent to form round or curved corners at 137. With two shapes only, the leg joint will be in the mid portion of the winding leg of the structure. If it is desired to have the leg joint nearer the one end or the other end of the core structure, this may readily be done by providing four different shaped punchings, two corresponding to Fig. 27 except for different lengths and two corresponding to Fig. 28 except for different lengths.

Fig. 29 illustrates the ease in cutting the punchings corresponding to Fig. 27 from a continuous strip of magnetic sheet steel. It will be noted that the shears are required to be set to swing to three positions only corresponding to the line 133 for making a cut at 60° to the direction of the length of the strip and the two positions represented by the lines 128 at 30° to the direction of the strip for making two cuts at the point of intersection 126 of the V-shaped ends of two pieces. Fig. 30 illustrates a continuous strip of magnetic sheet steel with markings for cutting a series of blanks corresponding to Fig. 28. In this case the steel strip is cut at the lines 136 and 132 alternating at 90° and 60° to the direction of the strip.

It will be appreciated that the layers of sheet steel laminations may consist of a single strip or of a small number of strips taken as a unit, such as three strips or five strips. For the purpose of illustration in figures such as 17 and 26, the layers are relatively thicker than would be used in the actual structure and consequently relatively fewer layers are shown. This is done in the drawings for the greater clarity in illustrating the principles of the invention involved.

A number of different patterns of center core joint structures is possible within the scope of the invention, and a number are illustrative in the figures following.

Referring to Figs. 31 to 35, inclusive, a core structure may be made from two different shaped punchings or sheared strips of magnetic sheet steel corresponding to the shapes shown in Figs. 34 and 35. In Fig. 34, a strip of steel 145 is cut at opposite ends 143 at an angle of 60° to the side of the strip and of a width and length suitable for the core structure to be built. A strip 144 is shown in Fig. 35 that is cut at an angle of 60° to the direction of the strip at one end 142 and at an angle of 90° to the direction of the strip at the other end 141. As shown in Fig. 31, one sheet of steel corresponding to Fig. 35 and two sheets corresponding to Fig. 34 are united, the strip 144 having a right angled end 141 extending between the strips 145 and 146 each having ends 143 at 60° to the direction of the strip. This pattern is repeated in Figs. 32 and 33, except for the rotation of the pattern through one-third revolution and two-thirds of a revolution, respectively, in a manner similar to that shown in Figs. 4, 5 and 6. By rotating the patterns as shown in Figs. 31, 32 and 33, the lamination layers at the center joint will be interleaved forming center core structure.

Referring to Figs. 36 through 40, another pattern is illustrated in which two strips shown at 151 and 152 in Fig. 40 are brought into engagement along a 60° angle joint at 153 and a portion of the outer corner thereof is cut at 154. These two sheets 151 and 152 are brought together with a sheet 155 shown in Fig. 36 as having an end cut at right angles at 156 and the pattern shown in Fig. 36 is repeated in Figs. 37 and 38, except that the pattern is rotated so that the three sheets as shown in Fig. 37 are positioned one-third of a revolution from the position shown in Fig. 36, and as shown in Fig. 38 are shown as rotated two-thirds of a revolution from the position shown in Fig. 36. Thus in stacking the three patterns shown in Figs. 36, 37 and 38 and in continuing the rotation of the layers in a similar manner throughout the core structure, a form of center joint is built corresponding to that shown in Fig. 39, in which the central core joint is in the triangular area outlined in Fig. 39 by the points 157, 158 and 159 and the superposed layers are interleaved in the manner shown in the full and dotted lines in Fig. 39.

Referring to Figs. 41 to 45, inclusive, each layer at the center joint consists of three sheets 161, 162 and 163 extending in directions from the center of the joint outwardly in directions corresponding to a third of a revolution or 120° apart. Each of the three sheets is cut at its end in a straight line at an angle of 60° to the direction of the strip. The strip 161 is shown positioned between the ends of the strip 162 and 163 so that the end of the strip 162 engages the end of the strip 161 at 164 and the end of the strip 163 engages the side of the strip 161 adjacent its end at 165. Each of three strips is formed as shown in Fig. 45, the strip being designated in that figure by the number 166 and cut at its opposite ends 167 and 168 along a 60° line, thus making a parallelogram. The ends of three such strips are united to form the pattern shown in Figs. 41, 42 and 43 and the opposite ends thereof unite in angle joints corresponding to that illustrated in Figs. 22, 23 and 24 in the leg of the core structure. When the three patterns, rotated in the manner illustrated in Figs. 41, 42 and 43 with respect to one another, are positioned the one layer above the other, the layers are interleaved as shown in Fig. 44 between the corner joints 169 of a triangle outlining the center core area.

It will be understood by those skilled in the art that modifications may be made in the details of the structures illustrated and described without departing from the spirit of our invention and we do not wish to be limited otherwise than by the scope of the attached claims.

We claim as our invention:

1. In a three-phase core structure for electrical induction apparatus, in combination, three U-shaped core members formed of a plurality of layers of laminations of magnetic sheet material, each of the U-shaped core members having a substantially straight winding leg portion forming the center portion of each U-shaped member and yoke portions at each end of the leg portions extending substantially at right angles to the leg portions, the yoke portions of the three core members meeting in center joints spaced along the axis of the core structure at the top and bottom thereof, the three core members extending outwardly from the axis of the core structure in directions displaced substantially 120° from each other, the ends of the sheets of magnetic material in each layer in the three core members meeting in the center joint area to form a pattern of meeting edges of the sheets in the several core members unsymmetrical with respect to the axis of the core structure, the successive layers of magnetic sheet material being so positioned that the pattern of meeting edges in a layer progressively rotates a third of a revolution between successive adjacent layers to form lap-butt joints at the center joints and to give a progressively displaced joint pattern in each of three successive layers, each winding leg portion being provided with a core joint in which the ends of the several layers of magnetic sheet steel at the joint overlap the ends of the adjacent layers to provide an upper and a lower core part each having three winding leg parts joined together in the completed core assembly, the several layers of magnetic sheet material comprising the core structure being free to flex individually with respect to one another to reduce the noise level of the core caused by magnetostriction.

2. In a three-phase core structure for electrical induction apparatus, in combination, three U-shaped core members formed of a plurality of layers of laminations of magnetic sheet material, each of the U-shaped core members having a substantially straight winding leg portion forming the center portion of each U-shaped member and yoke portions at each end of the leg portions extending substantially at right angles to the leg portions, the yoke portions of the three core members meeting at the top and bottom of the core structure in center joint areas common to the three core members; the three core members extending outwardly from the axis of the core structure in directions displaced substantially 120° from each other, the ends of the sheets of magnetic material in each layer in the three core members meeting in the center joint area to form a pattern of meeting edges of the sheets in the several core members in which the end of one sheet of magnetic material from one of the three core members in each layer extends over the center joint area and terminates in a V-shaped end and the sheets from the other two core members in that layer terminate in straight line edges meeting the edges of the V-shaped end of the first named sheet along the periphery of the center joint area, the successive layers of magnetic sheet material being so positioned that the pattern of meeting edges progressively rotates a third of a revolution between successive adjacent layers to form interleaved lap-butt joints at the center joints and to give a progressively displaced joint pattern in each of three successive layers, the bend in the sheets of magnetic sheet steel from the leg portions of the core members to the yoke portions thereof taking place gradually to provide round corners between these portions of the core members, each winding leg portion being provided with a core joint to provide an upper and lower core section each having three winding leg parts joined together in the completed core assembly and in which the ends of the adjacent layers of magnetic sheet steel meeting at the leg points are continuous straight lines oblique to the direction of the layer of sheet steel and extending in different directions in adjacent layers, the several layers of magnetic sheet material comprising the core structure being free to flex individually with respect to one another to reduce the noise level of the core caused by magnetostriction.

3. In a three phase core structure for electrical induction apparatus, in combination, three U-shaped core members formed of a plurality of layers of laminations of magnetic sheet material, each of the U-shaped core members having a substantially straight winding leg portion forming the center portion of each U-shaped member and yoke portions at each end of the leg potrions extending substantially at right angles to the leg portions, the yoke portions of the three core members meeting at the top and bottom of the core structure in center joint areas common to the three core members, the three core members extending outwardly from the axis of the core structure in directions displaced substantially 120° from each other, the ends of the sheets of magnetic material in each layer in the three core members meeting in the center joint area to form a pattern of meeting edges of the sheets in the several core members in which the end of a sheet of magnetic material from one of the three core members in each layer is V-shaped and extends over the center joint area with the edges of the V-shaped ends at right angles to the direction of the other two core members, and the sheets from the other two core members in that layer terminate in straight line edges meeting the edges of the first-named sheet along the edges of a triangle outlining the center joint area, the successive layers of magnetic sheet material being so positioned that the pattern of meeting edges progressively rotates a third of a revolution between successive adjacent layers to form lap-butt joints at the center joints and to give a progressively displaced joint pattern in each of three successive layers, each winding leg portion being provided with a core joint to separate the core structure into an upper and a lower core section each having three winding leg parts joined together in the completed core assembly.

4. In a three-phase core structure for electrical induction apparatus, in combination, three U-shaped core members formed of a plurality of layers of laminations of magnetic sheet material, each of the U-shaped core members having a substantially straight winding leg portion forming the center portion of each U-shaped member and yoke portions at each end of the leg portions extending substantially at right angles to the leg portions, the yoke portions of the three core members meeting in center joints spaced along the axis of the core structure at the top and bottom thereof, the three core members extending outwardly from the axis of the core structure in directions displaced substantially 120° from each other, the ends of the sheets of magnetic material in each layer in the three core members meeting in the center joint area to form a pattern of meeting edges of the sheets in the several core members unsymmetrical with respect to the axis of the core structure, the successive layers of magnetic sheet material being so positioned that the pattern of meeting edges in a layer progressively rotates a third of a revolution between successive adjacent layers to form lap-butt joints at the center joints and to give a progressively displaced joint pattern in each of three successive layers, the bend in the sheets of magnetic sheet steel from the leg portions of the core members to the yoke portions thereof taking place gradually to provide round corners between these portions of the core members.

5. In a three-phase core structure for electrical induction apparatus, in combination, three U-shaped core members formed of a plurality of layers of laminations of magnetic sheet material, each of the U-shaped core members having a substantially straight winding leg portion forming the center portion of each U-shaped member and yoke portions at each end of the leg portions extending substantially at right angles to the leg portions, the yoke portions of the three core members meeting in center joints spaced along the axis of the core structure at the top and bottom thereof, the three core members extending outwardly from the axis of the core structure in directions displaced substantially 120° from each other, the ends of the sheets of magnetic material in each layer in the three core members meeting in the center joint area to form a pattern of meeting edges of the sheets in the several core members unsymmetrical with respect to the axis of the core structure, the successive layers of magnetic sheet material being so positioned that the pattern of meeting edges in a layer progressively rotates a third of a revolution between successive adjacent layers to form lap-butt joints at the center joints and to give a progressively displaced joint pattern in each of three successive layers, each winding leg portion being provided with a core joint to provide an upper and a lower core section each having three winding leg parts joined together in the completed core assembly and in which the ends of the layers of magnetic sheet steel meeting at the leg joints are continuous straight lines oblique to the direction of the strip of sheet steel and extending in different directions in adjacent layers, the several layers of magnetic sheet steel comprising the core structure being free to flex individually with respect to one another to reduce the noise level of the core caused by magnetostriction.

6. In a three-phase core structure for electrical induction apparatus, in combination, three U-shaped core members, each formed from a group of superimposed layers of laminations of magnetic sheet steel having preferred magnetic characteristics in the direction of the sheet and each having a substantially straight winding leg portion forming the center portion of each U-shaped member and yoke portions at each end of the leg portions extending substantially at right angles to the leg portions, the yoke portions of the three core members meeting in center joints spaced along the axis of the core structure at the top and bottom thereof, the three core members extending outwardly from the axis of the core structure in directions displaced substantially 120° from each other, the ends of the sheets of magnetic material in each layer in the three core members meeting in the center joint area to form a pattern of meeting edges of the sheets in the several core members unsymmetrical with respect to the axis of the core structure, the successive layers of magnetic sheet material being so positioned that the pattern of meeting edges in a layer progressively rotates a third of a revolution between successive adjacent layers to form lap-butt joints at the center joints and to give a progressively displaced joint pattern in each of three successive layers, the several layers of magnetic sheet material comprising the core structure being free to flex individually with respect to one another to reduce the noise level of the core caused by magnetostriction.

7. In a three-phase core structure for electrical induction apparatus, in combination, three U-shaped core members formed of a plurality of layers of laminations of magnetic sheet material, each of the U-shaped core members having a substantially straight winding leg portion forming the center portion of each U-shaped member and yoke portions at each end of the leg portions extending substantially at right angles to the leg portions, the yoke portions of the three core members meeting at the top and bottom of the core structure in center joint areas common to the three core members, the three core members extending outwardly from the axis of the core structure in directions displaced substantially 120° from each other, the ends of the sheets of magnetic material in each layer in the three core members meeting in the center joint area to form a pattern of meeting edges of the sheets in the several core members in which the end of one sheet of magnetic material from one of the three core members in each layer extends over the center joint area and terminates in a V-shaped end and the sheets from the other two core members in that layer terminate in straight line edges meeting the edges of the V-shaped end of the first named sheet along the periphery of the center joint area, the successive layers of magnetic sheet material being so positioned that the pattern of meeting edges progressively rotates a third of a revolution between successive adjacent layers to form interleaved lap-butt joints at the center joints and to give a progressively displaced joint pattern in each of three successive layers, the bend in the sheets of magnetic sheet steel from the leg portions of the core members to the yoke portions thereof taking place gradually to provide round corners between these portions of the core members, each winding leg portion being provided with a core joint to provide an upper and a lower core section each having three winding leg parts joined together in the completed core assembly and in which the ends of the adjacent layers of magnetic sheet steel meeting at the leg joints are continuous straight lines oblique to the direction of the strip of sheet steel and extending in different directions in adjacent layers.

8. In a three-phase core structure for electrical induction apparatus, in combination, three U-shaped core members formed of a plurality of layers of laminations of magnetic sheet material, each of the U-shaped core members having a substantially straight winding leg portion forming the center portion of each U-shaped member and yoke portions at each end of the leg portions extending substantially at right angles to the leg portions, the yoke portions of the three core members meeting in center joints spaced along the axis of the core structure at the top and bottom thereof, the three core members extending outwardly from the axis of the core structure in directions displaced substantially 120° from each other, the ends of the sheets of magnetic material in each layer in the three core members meeting in the center joint area to form a pattern of meeting edges of the sheets in the several core members unsymmetrical with respect to the axis of the core structure, the successive layers of magnetic sheet material being so positioned that the pattern of meeting edges in a layer progressively rotates a third of a revolution between successive adjacent layers to form lap-butt joints at the center joints and to give a progressively displaced joint pattern in each of three successive layers, each winding leg portion being provided with a core joint in which the ends of the several layers of magnetic sheet steel at the joint overlap the ends of the adjacent layers to provide an upper and a lower core part each having three winding leg parts joined together in the completed core assembly.

9. In a three-phase core structure for electrical induction apparatus, in combination, three U-shaped core members formed of a plurality of layers of laminations of magnetic sheet material, each of the U-shaped core members having a substantially straight winding leg portion forming the center portion of each U-shaped member and yoke portions at each end of the leg portions extending substantially at right angles to the leg portions, the yoke portions of the three core members meeting at the top and bottom of the core structure in center joint areas common to the three core members, the three core members extending outwardly from the axis of the core structure in directions displaced substantially 120° from each other, the ends of the sheets of magnetic material in each layer in the three core members meeting in the center joint area to form a pattern of meeting edges of the sheets in the several core members in which the end of one sheet of magnetic material from one of the three core members in each layer extends over the center joint area and terminates in a V-shaped end and the sheets from the other two core members in that layer terminate in straight line edges meeting the edges of the V-shaped end of the first named sheet along the periphery of the center joint area, the successive layers of magnetic sheet material being so positioned that the pattern of meeting edges progressively rotates a third of a revolution between successive adjacent layers to form interleaved lap-butt joints at the center joints and to give a progressively displaced joint pattern in each of three successive layers, the bend in the sheets of magnetic sheet steel from the leg portions of the core members to the yoke portions thereof taking place gradually to provide round corners between these portions of the core members, each winding leg portion being provided with a core joint to provide an upper and a lower core section each having three winding leg parts joined together in the completed core assembly, the several layers of magnetic sheet material comprising the core structure being free to flex individually with respect to one another to reduce the noise level of the core caused by magnetostriction.

10. In a three-phase core structure for electrical induction apparatus, in combination, three U-shaped core members formed of a plurality of layers of laminations of magnetic sheet material, each of the U-shaped core members having a substantially straight winding leg portion forming the center portion of each U-shaped member and yoke portions at each end of the leg portions extending substantially at right angles to the leg portions, the yoke portions of the three core members meeting in center joints spaced along the axis of the core structure at the top and bottom thereof, the three core members extending outwardly from the axis of the core structure in directions displaced substantially 120° from each other, the ends of the sheets of magnetic material in each layer in the three core members meeting in the center joint area to form a pattern of meeting edges of the sheets in the several core members unsymmetrical with respect to the axis of the core structure, the successive layers of magnetic sheet material being so positioned that the pattern of meeting edges in a layer progressively rotates a third of a revolution between successive adjacent layers to form lap-butt joints at the center joints and to give a progressively displaced joint pattern in each of three successive layers.

11. In a three-phase core structure for electrical induction apparatus, in combination, three U-shaped core members formed of a plurality of layers of laminations of magnetic sheet material, each of the U-shaped core members having a substantially straight winding leg portion forming the center portion of each U-shaped member and yoke portions at each end of the leg portions extending substantially at right angles to the leg portions, the yoke portions of the three core members meeting at the top and bottom of the core structure in center joint areas common to the three core members, the three core members extending outwardly from the axis of the core structure in directions displaced substantially 120° from each other, the ends of the sheets of magnetic material in each layer in the three core members meeting in the center joint area to form a pattern of meeting edges of the sheets in the several core members in which the end of one sheet of magnetic material from one of the three core members in each layer extends over the center joint area and terminates in a V-shaped end and the sheets from the other two core members in that layer terminate in straight line edges meeting the edges of the V-shaped end of the first named sheet along the periphery of the center joint area, the successive layers of magnetic sheet material being so positioned that the pattern of meeting edges progressively rotates a third of a revolution between successive adjacent layers to form interleaved lap-butt joints at the center joints and to give a progressively displaced joint pattern in each of three successive layers, the bend in the sheets of magnetic sheet steel from the leg portions of the core members to the yoke portions thereof taking place gradually to provide round corners between these portions of the core members, each winding leg portion being provided with a core joint to provide an upper and a lower core section each having three winding leg parts joined together in the completed core assembly.

12. In a three-phase core structure for electrical induction apparatus, in combination, three U-shaped core members formed of a plurality of layers of laminations of magnetic sheet material, each of the U-shaped core members having a cruciform cross-section and each having a substantially straight winding leg portion forming the center portion of each U-shaped member and yoke portions at each end of the leg portions extending substantially at right angles to the leg portions, the yoke portions of the three core members meeting in center joints spaced along the axis of the core structure at the top and bottom thereof, the three core members extending outwardly from the axis of the core structure in directions displaced substantially 120° from each other, the ends of the sheets of magnetic material in each layer in the three core members meeting in the center joint area to form a pattern of meeting edges of the sheets in the several core members unsymmetrical with respect to the axis of the core structure, the successive layers of magnetic sheet material being so positioned that the pattern of meeting edges in a layer progressively rotates a third of a revolution between successive adjacent layers to form lap-butt joints at the center joints and to give a progressively displaced joint pattern in each of three successive layers, each winding leg portion being provided with a core joint in which the ends of the several layers of magnetic sheet steel at the joint overlap the ends of the adjacent layers to provide an upper and a lower core part each having three winding leg parts joined together in the completed core assembly, the several layers of magnetic sheet material comprising the core structure being free to flex individually with respect to one another to reduce the noise level of the core caused by magnetostriction.

13. In a three-phase core structure for electrical induction apparatus, in combination, three U-shaped core members formed of a plurality of layers of laminations of magnetic sheet material, each of the U-shaped core members having a cruciform cross-section, each having a substantially straight winding leg portion forming the center portion of each U-shaped member and yoke portions at each end of the leg portions extending substantially at right angles to the leg portions, the yoke portions of the three core members meeting at the top and bottom of the core structure in center joint areas common to the three core members, the three core members extending outwardly from the axis of the core structure in directions displaced substantially 120° from each other, the ends of the sheets of magnetic material in each layer in the three core members meeting in the center joint area to form a pattern of meeting edges of the sheets in the several core members in which the end of one sheet of magnetic material from one of the three core members in each layer extends over the center joint area and terminates in a V-shaped end and the sheets from the other two core members in that layer terminate in straight line edges meeting the edges of the V-shaped end of the first named sheet along the periphery of the center joint area, the successive layers of magnetic sheet material being so positioned that the pattern of meeting edges progressively rotates a third of a revolution between successive adjacent layers to form interleaved lap-butt joints at the center joints and to give a progressively displaced joint pattern in each of three successive layers, the bend in the sheets of magnetic sheet steel from the leg portions of the core members to the yoke portions thereof taking place gradually to provide round corners between these portions of the core members, each winding leg portion being provided with a core joint to provide an upper and a lower core section each having three winding leg parts joined together in the completed core assembly.

14. In a three-phase core structure for electrical induction apparatus, in combination, three U-shaped core members formed of a plurality of layers of laminations of magnetic sheet material, each of the U-shaped core members having a cruciform cross-section and each having a substantially straight winding leg portion forming the center portion of each U-shaped member and yoke portions at each end of the leg portions extending substantially at right angles to the leg portions, the yoke portions of the three core members meeting in center joints spaced along the axis of the core structure at the top and bottom thereof, the three core members extending outwardly from the axis of the core structure in directions displaced substantially 120° from each other, the ends of the sheets of magnetic material in each layer in the three core members meeting in the center joint area to form a pattern of meeting edges of the sheets in the several core members unsymmetrical with respect to the axis of the core structure, the successive layers of magnetic sheet material being so positioned that the pattern of meeting edges in a layer progressively rotates a third of a revolution between successive adjacent layers to form lap-butt joints at the center joints and to give a progressively displaced joint pattern in each of three successive layers, each winding leg portion being provided with a core joint in which the ends of the several layers of magnetic sheet steel at the joint overlap the ends of the adjacent layers to provide an upper and a lower core part each having three winding leg parts joined together in the completed core assembly.

15. In a three-phase core structure for electrical induction apparatus, in combination, three U-shaped core members formed of a plurality of layers of laminations of magnetic sheet material, each of the U-shaped core members having a cruciform cross-section and each having a substantially straight winding leg portion forming the center portion of each U-shaped member and yoke portions at each end of the leg portions extending substantially at right angles to the leg portions, the yoke portions of the three core members meeting at the top and bottom of the core structure in center joint areas common to the three core members, the three core members extending outwardly from the axis of the core structure in directions displaced substantially 120° from each other, the ends of the sheets of magnetic material in each layer in the three core members meeting in the center joint area to form a pattern of meeting edges of the sheets in the several core members in which the end of one sheet of magnetic material from one of the three core members in each layer extends over the center joint area and terminates in a V-shaped end and the sheets from the other two core members in that layer terminate in straight line edges meeting the edges of the V-shaped end of the first named sheet along the periphery of the center joint area, the successive layers of magnetic sheet material being so positioned that the pattern of meeting edges progressively rotates a third of a revolution between successive adjacent layers to form interleaved lap-butt joints at the center joints and to give a progressively displaced joint pattern in each of three successive layers, the bend in the sheets of magnetic sheet steel from the leg portions of the core members to the yoke portions thereof taking place gradually to provide round corners between these portions of the core members, the several layers of magnetic sheet material comprising the core structure being free to flex individually with respect to one another to reduce the noise level.

16. In a three-phase core structure for electrical induction apparatus, in combination, three U-shaped core members formed of a plurality of layers of laminations of magnetic sheet material, each of the U-shaped core members having a substantially straight winding leg portion forming the center portion of each U-shaped member and yoke portions at each end of the winding leg portions extending substantially at right angles to the leg portions, the yoke portions of the three core members meeting to form center joints common to the three core members at the top and bottom of the core structure, the three core members extending outwardly from the axis of the core structure in directions displaced substantially 120° from each other, the ends of the sheets of magnetic material in each layer in the three core members meeting in the center joint area to form a pattern of meeting edges of the sheets in the several core members in which the end of one sheet extends at right angles to its edges and the ends of the other sheets extend at an angle of 60° to the edges of the sheets and are along opposite sides of the first-named of the three sheets, the successive layers of magnetic sheet material at the center joint being so positioned that the pattern of meeting edges progressively rotates a third of a revolution between successive adjacent layers to form interleaved lap-butt joints at the center joints and to give a progressively displaced joint pattern in each of three successive layers.

17. In a three-phase core structure for electrical induction apparatus, in combination, three U-shaped core members formed of a plurality of layers of laminations of magnetic sheet material, each of the U-shaped core members having a substantially straight winding leg portion forming the center portion of each U-shaped member and yoke portions at each end of the winding leg portions extending substantially at right angles to the leg portions, the yoke portions of the three core members meeting to form center joints common to the three core members at the top and bottom of the core structure, the three core members extending outwardly from the axis of the core structure in directions displaced substantially 120° from each other, the ends of the sheets of magnetic material in each layer in the three core members meeting in the center joint area to form a pattern of meeting edges of the sheets in the several core members in which the end of one sheet extends at right angles to its side edges and the ends of the other two sheets terminate forming two edges at right angles to each other, the three sheets meeting to form a T-shaped joint in which each sheet meets each of the other two sheets along a straight line joint, the successive layers of magnetic sheet material at the center joint being so positioned that the pattern of meeting edges progressively rotates a third of a revolution between successive adjacent layers to form interleaved lap-butt joints at the center joints and to give a progressively displaced joint pattern in each of three successive layers.

18. In a three-phase core structure for electrical induction apparatus, in combination, three U-shaped core members formed of a plurality of layers of laminations of magnetic sheet material, each of the U-shaped core members having a substantially straight winding leg portion forming the center portion of each U-shaped member and yoke portions at each end of the winding leg portions the yoke portions of the three core members meeting to form center joints common to the three core members at the top and bottom of the core structure, the three core members extending outwardly from the axis of the core structure in directions displaced substantially 120° from each other, the ends of the sheets of magnetic material in each layer in the three core members meeting in the center joint area to form a pattern of meeting edges of the sheets in the several core members in which the end of each one of the three sheets extend at an angle of 60° to the edges of the sheet and one of the three sheets extends between the ends of the other two sheets, the successive layers of magnetic sheet material at the center joint being so positioned that the pattern of meeting edges progressively rotates a third of a revolution between successive adjacent layers to form interleaved lap-butt joints at the center joint and to give a progressively displaced joint pattern in each of three successive layers.

19. A three phase magnetic core comprising, in combination, three generally U-shaped bundles of layers of flatwise curved laminations of magnetic material, each of the U-shaped bundles having corresponding end portions disposed to meet and form yoke areas, each of the end portions having one layer of each of three successive layers lengthwise offset with respect to the other two of said three successive layers, said lengthwise offset one layer of each of the three corresponding successive layers of each of the corresponding end portions forming a yoke area being a progressively different layer for the three bundles, said three bundles being disposed with the corresponding end portions facing each other with the lengthwise offset layers of the corresponding end portions forming butt and lap joints interconnecting the corresponding ends of the bundles.

CLIFFORD C. HORSTMAN.
CHARLES E. BURKHARDT.
BELVIN B. ELLIS.

REFERENCES CITED

The following references are of record in the file of this patent:

UNITED STATES PATENTS

| Number | Name | Date |
| --- | --- | --- |
| 2,367,927 | Chubb | Jan. 23, 1945 |
| 2,456,459 | Somerville | Dec. 14, 1948 |
| 2,456,460 | Somerville | Dec. 14, 1948 |
| 2,456,461 | Dunn | Dec. 14, 1948 |
| 2,467,867 | Somerville | Apr. 19, 1949 |
| 2,486,220 | Somerville | Oct. 25, 1949 |

FOREIGN PATENTS

| Number | Country | Date |
| --- | --- | --- |
| 108,862 | Austria | Feb. 10, 1928 |